United States Patent [19]
Sato

[11] Patent Number: 5,465,334
[45] Date of Patent: Nov. 7, 1995

[54] PROCESSOR WITH A RESPECTIVE LATCH PROVIDED FOR EACH PIPELINED STAGE TO TRANSFER DATA TO THE PIPELAND STAGES

[75] Inventor: Taizo Sato, Kawasaki, Japan

[73] Assignee: Fujitsu Limited, Kawasaki, Japan

[21] Appl. No.: 121,507

[22] Filed: Sep. 16, 1993

[30] Foreign Application Priority Data

Sep. 16, 1992 [JP] Japan .................................. 4-246691
Sep. 2, 1993 [JP] Japan .................................. 5-218850

[51] Int. Cl.$^6$ .................................................. G06F 9/38
[52] U.S. Cl. .................................. 395/375; 364/DIG. 1; 364/DIG. 2; 364/231.8
[58] Field of Search ........................ 364/DIG. 1, DIG. 2; 395/200, 400, 425, 375, 800

[56] References Cited

U.S. PATENT DOCUMENTS 5,185,868  2/1993  Tran ........................................ 395/375

FOREIGN PATENT DOCUMENTS

61-7969  1/1986  Japan .

Primary Examiner—Robert B. Harrell
Attorney, Agent, or Firm—Staas & Halsey

[57] ABSTRACT

A processor which executes instructions using pipeline processing having an effective address calculation stage and an operation stage, at least one stage existing between the effective address calculation stage and the operation stage. A register temporarily stores data. A pipeline latch part includes a respective latch provided for, and respectfully corresponding to, each stage between the effective address calculation stage and the operation stage and includes a respective latch corresponding to the operation stage. During the effective address calculation stage, the pipeline latch part receives data stored in the register and transfers the received data through the each respective latch in accordance with the execution of instructions to provide the data to the respective latch corresponding to the operation stage when the operation stage performs an operation. During the effective address calculation stage, an effective address calculation part receives data stored in the register and adds the data to a displacement of an instruction code, to thereby calculate an effective address. During the operation stage, an operation part receives data stored in the register, receives data from the latch corresponding to the operation stage in the pipeline latch part, and executes an operation on the received data.

8 Claims, 11 Drawing Sheets

| OP.CODE (IRi) 6 | 5 | 4 | 3 | 2 | 1 | 0 | MNEMONIC INST. | EF.ADD. CALC. | MEMORY ACCESS |
|---|---|---|---|---|---|---|---|---|---|
| 0 | 0 | 0 | 0 | 1 | 0 | 0 | @SP+ | PRESENT | PRESENT |
| 0 | 0 | 0 | 0 | 1 | 0 | 1 | @−SP | PRESENT | PRESENT |
| 0 | 0 | 0 | 1 | 0 | 0 | 1 | @d16 | PRESENT | PRESENT |
| 0 | 0 | 0 | 1 | 0 | 1 | 0 | @d32 | PRESENT | PRESENT |
| 0 | 0 | 0 | 1 | 1 | 0 | 0 | #IMM | ABSENT | ABSENT |
| 0 | 0 | 0 | 1 | 1 | 0 | 1 | @(PC, d16) | PRESENT | PRESENT |
| 0 | 0 | 0 | 1 | 1 | 1 | 0 | @(PC, d32) | PRESENT | PRESENT |
| 0 | 0 | 1 | * | * | * | * | $R_n$ | ABSENT | ABSENT |
| 0 | 1 | 0 | * | * | * | * | @($R_n$, d16) | PRESENT | PRESENT |
| 0 | 1 | 1 | * | * | * | * | @$R_n$ | PRESENT | PRESENT |
| 1 | 0 | 0 | * | * | * | * | @($R_n$, d32) | PRESENT | PRESENT |

Fig.11

PROCESSOR WITH A RESPECTIVE LATCH PROVIDED FOR EACH PIPELINED STAGE TO TRANSFER DATA TO THE PIPELAND STAGES

BACKGROUND OF THE INVENTION

1. Field of the Invention

The present invention relates to a processor using a pipeline processing. More particularly, it relates to a technique of effecting an access to a register in a one-chip processor which carries out high speed operation processings.

2. Description of the Related Art

Recently, processors have been required to have a higher performance and a lower cost. As a processing system for obtaining higher performance, a pipeline processing is known. In this connection, processors which can execute most of the instructions in one cycle using pipeline processing are on the market. On the other hand, to realize the lower cost, it is essential to reduce the scale of circuit, i.e., the chip size.

However, where pipeline processing is adopted for higher performance, a problem occurs in that it is necessary to provide a port for effecting an access to a register, for each of the pipeline stages, and thus, the scale of circuit of the register becomes large. Also, when the scale of circuit of the register becomes large, further problems arise in that the chip size accordingly becomes large, and the wiring length becomes longer, thereby resulting in an increase in the signal propagation delay on the wiring. Time for the access to the register is one of the critical paths for determining the operational speed of the chip. Accordingly, where the time for the access to the register becomes longer, there is a possibility in that the chip cannot exhibit maximum performance.

In view of the above problems, it has been required, without lowering the performance of the pipeline processing, to decrease the number of ports for accessing the register so as to reduce the scale of circuit, and to realize a high speed operation of the chip.

Note, the problems in the prior art will be explained later in detail in contrast with the preferred embodiments of the present invention.

SUMMARY OF THE INVENTION

An object of the present invention is to provide a processor which, without lowering the performance thereof in an execution of pipeline processing, can decrease the number of ports for access to a register part to reduce the scale of circuit, and thus can contribute to a high speed operation thereof.

According to the present invention, there is provided a processor which carries out an execution of instruction using pipeline processing having at least an effective address calculation stage and an operation stage, the processor comprising: a register part for temporarily storing operand data; a pipeline latch part including latches provided for each pipeline stage between the effective address calculation stage and the operation stage, and holding data read from the register part, respectively; an effective address calculation part for adding data read from the register part at the effective address calculation stage to a displacement extracted from an instruction code, to thereby calculate an effective address; and an operation part for inputting data read from the register part at the operation stage and data read from a corresponding latch in the pipeline latch part, to thus execute the operation, and for outputting a result of the operation to the register part, the pipeline latch part holding a result read from the register part at the effective address calculation stage until a timing at which the result is required at the operation stage, and feeding the held result as an operand data to the operation part.

BRIEF DESCRIPTION OF THE DRAWINGS

Other objects and features of the present invention will be described hereinafter in detail by way of preferred embodiments with reference to the accompanying drawings, in which.

DESCRIPTION OF THE PREFERRED EMBODIMENTS

Throughout the description, identical references used in connection with the drawings indicate like constituent elements, and thus the repetition of explanation thereof is omitted.

First, for a better understanding of a preferred embodiment of the present invention, the related prior art will be explained with reference to FIG. 1.

In general, processors which carry out an execution of instruction using pipeline processing often adopt a pipeline system having at least an effective address calculation stage and an operation stage.

Figure 1:
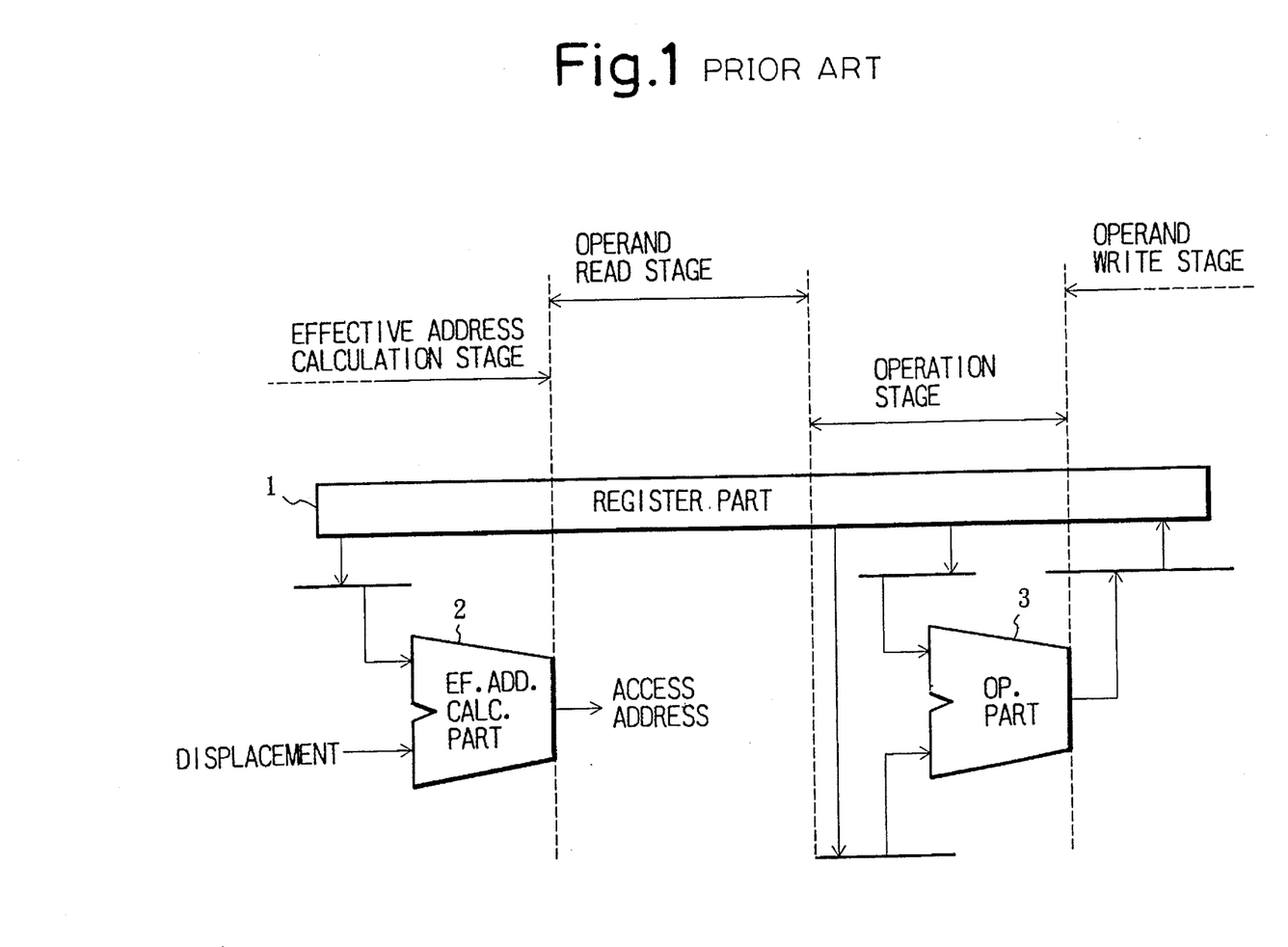
FIG. 1 is a diagram illustrating a constitution of a prior art processor using a pipeline processing.

FIG. 1 illustrates a constitution of a prior art processor using pipeline processing.

The illustration shows a constitution of the processor which carries out an execution of instruction using pipeline processing having an effective address calculation stage, an operand read stage, an operation stage and an operand write stage. The processor includes a register part 1, an effective address calculation part 2 and an operation part 3.

The register part 1 is a block for temporarily storing operand data, and feeds data to the effective address calculation part 2 at the effective address calculation stage and feeds data to the operation part 3 at the operation stage. The effective address calculation part 2 adds data read from the register part 1 at the effective address calculation stage to a displacement extracted from an instruction code, and thereby calculates an effective address. The operation part 13 is a block for executing operations for operands, and executes an operation based on data read from the register part 1 at the operation stage and outputs a result of the operation to the register part 1.

In a processor adopting a pipeline processing system of the above type as shown in FIG. 1, both a register access for the effective address calculation and a register access for the operation processing must be carried out, and accordingly it is necessary to provide a great number of ports for access to the register part. Where it is impossible to provide the great number of access ports from a viewpoint of the circuit design, it is necessary to provide a register circuit for exclusive use for each pipeline stage. Namely, by providing a plurality of register circuits (corresponding to the number of stages) each having an identical content, it is possible to equivalently increase the number of access ports.

In the prior art pipeline processing system, where the designation of the effective address indicates a register-direct designation, it is unnecessary to effect a register read processing at the effective address calculation stage, while it is necessary to effect a register read processing at the operation stage. Also, where the designation of the effective address indicates a memory reference designation, it is unnecessary to effect a register read processing at the operation stage, while it is necessary to effect a register read processing at the effective address calculation stage. Accordingly, with respect to an identical instruction, it is sufficient only to effect a register read processing either at the effective address calculation stage, or at the operation stage. In this case (i.e., identical instruction), no problem occurs.

In pipeline processings, however, an instruction being processed at the effective address calculation stage and an instruction being processed at the operation stage are usually different from each other. In this case, a problem occurs in that the register read processings are carried out simultaneously at the effective address calculation stage and the operation stage. To cope with this, in the prior art, measures have been taken to prevent the respective register read processings for each stage from interfering with each other, by providing a register read port for each stage, or by providing only one register read port to selectively bring each stage into a wait state.

In the case of the former (system having a register read port for each pipeline stage), however, disadvantages arise in that the scale of circuit of the register part, i.e., the chip size, becomes large, and in that the wiring length becomes longer resulting in an increase in the signal propagation delay on the wiring. On the other hand, in the case of the latter (system having only one register read port), a problem occurs in that the performance of the pipeline processing is lowered due to insertion of the wait state and thus the effectiveness of the pipeline processing is damaged.

To cope with this, the processor of the present invention is provided with means for holding a result read from the register part at the effective address calculation stage until a timing at which the result is required at the operation stage, and feeding the held result as an operation data (operand) at the operation stage.

Figure 2:
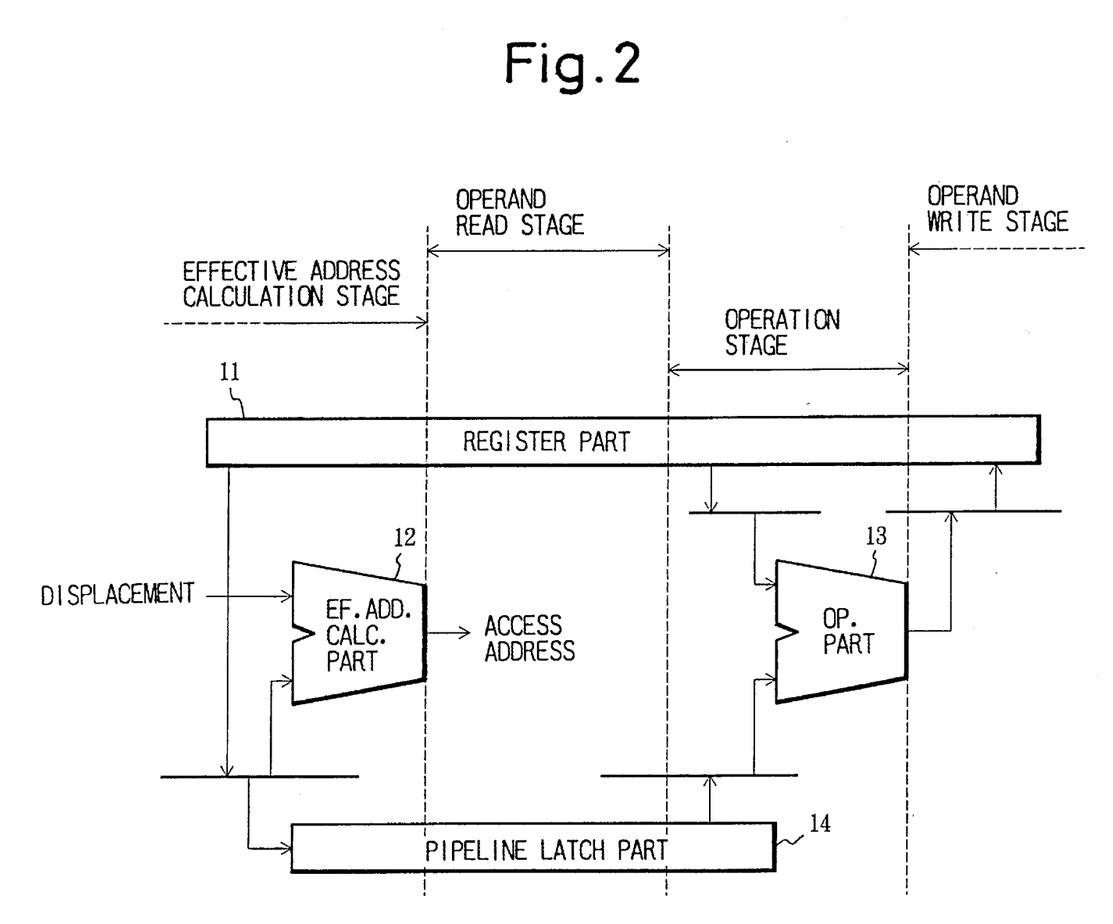
FIG. 2 is a diagram illustrating the fundamental constitution of the processor using a pipeline processing according to the present invention.

FIG. 2 illustrates the fundamental constitution of the processor using a pipeline processing according to the present invention.

The illustration shows a constitution of the processor which carries out an execution of instruction using a pipeline processing having at least an effective address calculation stage and an operation stage. The processor includes a register part 11, an effective address calculation part 12, an operation part 13 and a pipeline latch part 14.

The register part 11 is a block for temporarily storing operand data, and has the function of feeding data to the effective address calculation part 12 at the effective address calculation stage and feeding data to the operation part 13 at the operation stage.

The effective address calculation part 12 has the function of adding data read from the register part 11 at the effective address calculation stage to a displacement extracted from an instruction code, and thereby calculating an effective address.

The operation part 13 is a block (arithmetic and logic unit; ALU) for executing operations for operands, and has the function of inputting data read from the register part 11 at the operation stage and data read from a corresponding latch in the pipeline latch part 14, to thus execute the operation, and of outputting a result of the operation to the register part 11.

The pipeline latch part 14 is a block characterizing the present invention, and includes latches provided for each pipeline stage (in the illustration of FIG. 2, only an operand read stage is shown) between the effective address calculation stage and the operation stage, and holding data read from the register part 11, respectively. The pipeline latch part 14 has the function of holding a result read from the register part 11 at the effective address calculation stage until a timing at which the result is required at the operation stage, and feeding the held result as an operand data to the operation part 13.

According to the constitution shown in FIG. 2, data (register value) read from the register part 11 at the effective address calculation stage is taken into a corresponding latch in the pipeline latch part 14, and every time the execution of instruction proceeds to a subsequent pipeline stage, the register value is transferred to a latch corresponding to the pipeline stage concerned. Where the designation of the effective address indicates a register-direct designation, the register value is taken out as an operand data from a latch corresponding to the operation stage when the execution of instruction proceeds to the operation stage. (Namely, the register value is fed to the operation part 13.)

Thus, according to the processor of the present invention, the register value read from the register part 11 at the effective address calculation stage is held in the pipeline latch part 14 until a timing at which the register value is required at the operation stage, and the held register value is fed as an operand data to the operation part 13. Accordingly, without lowering the performance of the pipeline processing, it is possible to decrease the number of ports (i.e., read ports) for accessing to the register part 11. This contributes to a reduction in the scale of circuit of the register part, and also to a high speed operation.

Next, a preferred embodiment of the present invention will be explained with reference to FIGS. 3 to 11.

Figure 3:
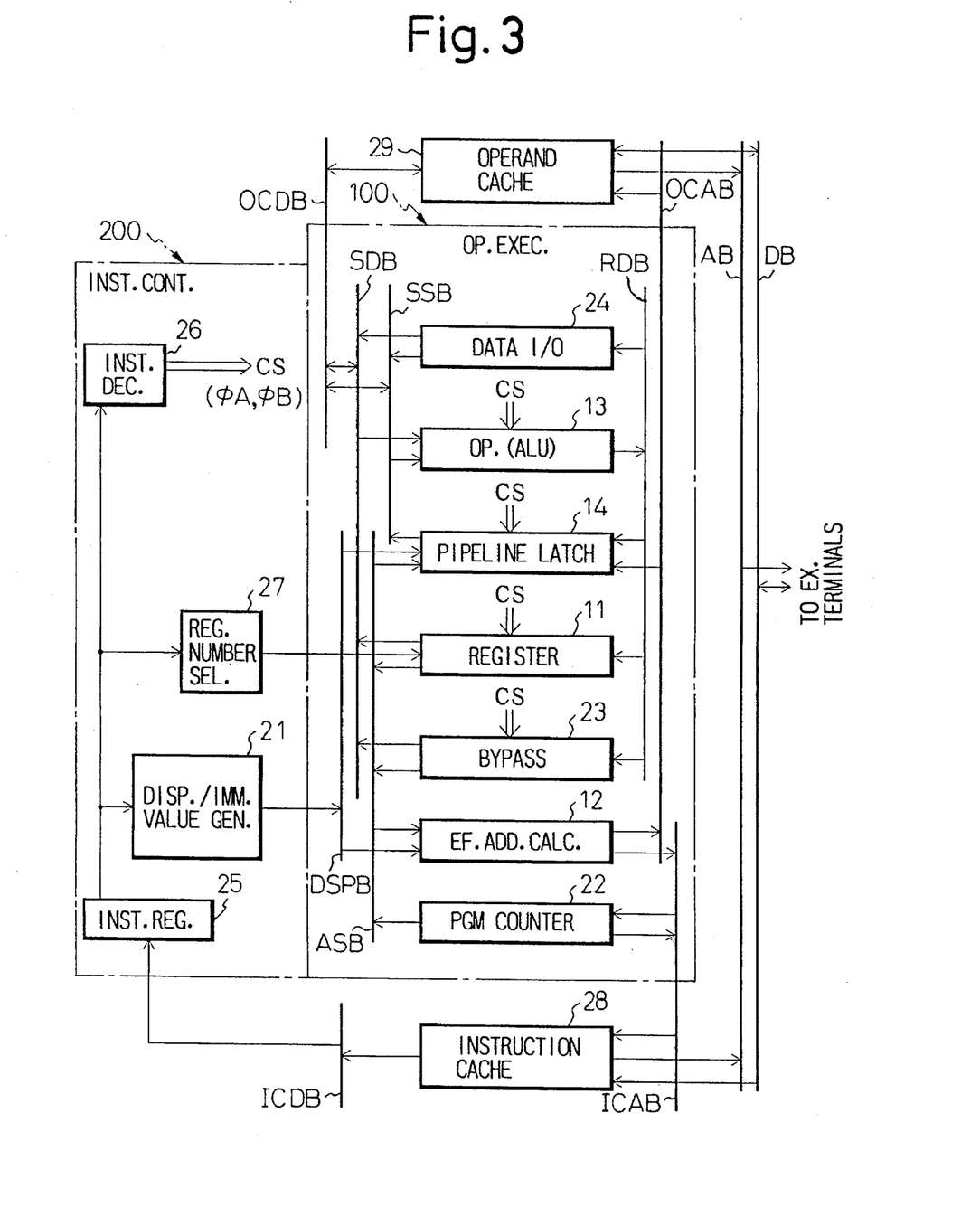
FIG. 3 is a block diagram illustrating the entire constitution of the processor using a pipeline processing according to an embodiment of the present invention.

FIG. 3 illustrates the entire constitution of the processor using a pipeline processing according to an embodiment of the present invention.

In the illustration, reference 100 denotes an operation execution part, which is a block for executing an address calculation for access to an external main memory and for carrying out operations designated by instructions. The operation execution part 100 includes the register part 11, the effective address calculation part 12, the operation part (ALU) 13 and the pipeline latch part 14, and further includes a program counter part 22, a bypass part 23 and a data input/output (I/O) part 24.

Also, reference 200 denotes an instruction control part, which is a block for receiving instructions via an instruction cache 28 (stated later) from the external main memory and for decoding the instructions so as to control the operation execution part 100. The instruction control part 200 includes a displacement/immediate value generation part 21, an instruction register 25, an instruction decoder 26 and a register number selection part 27.

Also, references 28 and 29 denote an instruction cache and an operand cache, respectively. Each cache is a block for temporarily storing data of the external main memory, for the purpose of high speed processing.

In the operation execution part 100, the register part 11 is a block having registers designated by instructions, for temporarily storing data for the effective address calculation and data for the operation as described above. The effective address calculation part 12 is a block for calculating an effective address for access to the main memory. Where the kind of an instruction to be processed is a branch instruction, the branch address is transferred to the program counter part 22. Also, where the kind of an instruction to be processed is an instruction to use an effective address as an operation data, the effective address in place of the register value is transferred to an operand read stage latch (see FIG. 4, latch 34) in the pipeline latch part 14. The operation part 13 has the function of receiving data from the register part 11, the pipeline latch part 14 and the data I/O part 24, carrying out an operation designated by an instruction to be processed, and feeding a result of the operation to the data I/O part 24, the register part 11 and the pipeline latch part 14.

Also, the pipeline latch part 14 takes thereinto a register value read from the register part 11 or an immediate value from the displacement/immediate value generation part 21 at the effective address calculation stage, and feeds the input data to the operation part 13 at the operation stage. Where there occurs a writing into a register corresponding to the held register value during transition from the effective address calculation stage to the operation stage, the write data is taken as the register value into the pipeline latch part 14, and then fed to the operation part 13 at the operation stage. Also, where the kind of an instruction to be processed is an instruction to use an effective address as an operation data (for example, an instruction to transfer an effective address per se to the register part or an external memory, an instruction to access to a plurality of memories based on an effective address, or the like), the effective address in place of the register value is transferred to the operand read stage latch in the pipeline latch part 14, and then fed to the operation part 13 at the operation stage.

Also, the program counter part 22 is a block for counting up the head address of an instruction in execution, and has the function of holding the head address of an instruction which is executed at each pipeline stage. The bypass part 23 is a block for feeding a result (data) of the operation in place of the register read data where read processing and write processing are carried out to an identical register. The data I/O part 24 is a block for receiving data used in the operation from an external main memory, or transmitting the data to the external main memory, via the operand cache 29.

On the other hand, in the instruction control part 200, the instruction register 25 receives an instruction code via the instruction cache 28 from the main memory, and feeds the instruction code to the displacement/immediate value generation part 21, the instruction decoder 26 and the register number selection part 27. The displacement/immediate value generation part 21 is a block for extracting and generating a displacement and an immediate value from the input instruction code. The generated displacement is fed to the effective address calculation part 12, and used in the effective address calculation. On the other hand, the generated immediate value is fed via the pipeline latch part 14 to the operation part 13, and used as data for the operation. The instruction decoder 26 decodes the input instruction code and thus generates various control signals CS (including clocks $\phi A$, $\phi B$, and the like) for controlling the operation execution part 100. As described later, the generated control signals CS are fed to the register part 11, the operation part 13, the pipeline latch part 14 and the bypass part 23. The register number selection part 27 generates register number designation information from the input instruction code, and designates a register number for access to the register part 11.

In the constitution of FIG. 3, each circuit or part is connected via various buses to each other. In the illustration, reference ICDB denotes an instruction cache data bus for feeding instructions from the instruction cache 28 to the instruction register 25; reference ICAB an instruction cache address bus for supplying the instruction cache 28 with addresses for reading instructions; reference OCDB an operand cache data bus for communicating data between the operand cache 29 and the operation part 13, and between the operand cache 29 and the data I/O part 24; reference OCAB an operand cache address bus for supplying the operand cache 29 with addresses to be accessed; reference DSPB a bus for feeding a displacement and an immediate value from the displacement/immediate value generation part 21 to the effective address calculation part 12 and the pipeline latch part 14, respectively, at the effective address calculation stage; reference ASB a bus for feeding register-read data from the register part 11 and the bypass part 23 to the effective address calculation part 12 and the pipeline latch part 14 at the effective address calculation stage; reference SDB a bus for feeding register-read data from the register part 11 and the bypass part 23 to the operation part 13 at the operation stage; reference SSB a bus for feeding register-read data and immediate values from the pipeline latch part 14 to the operation part 13 at the operation stage; and reference RDB a bus for feeding register-write data from the operation part 13 to the register part 11 and the bypass part 23 at the operand write stage. Also, reference DB denotes a data bus for communicating data between the present processor and an external device, and reference AB denotes an address bus for supplying an external main memory with addresses for reading instructions.

Figure 4:
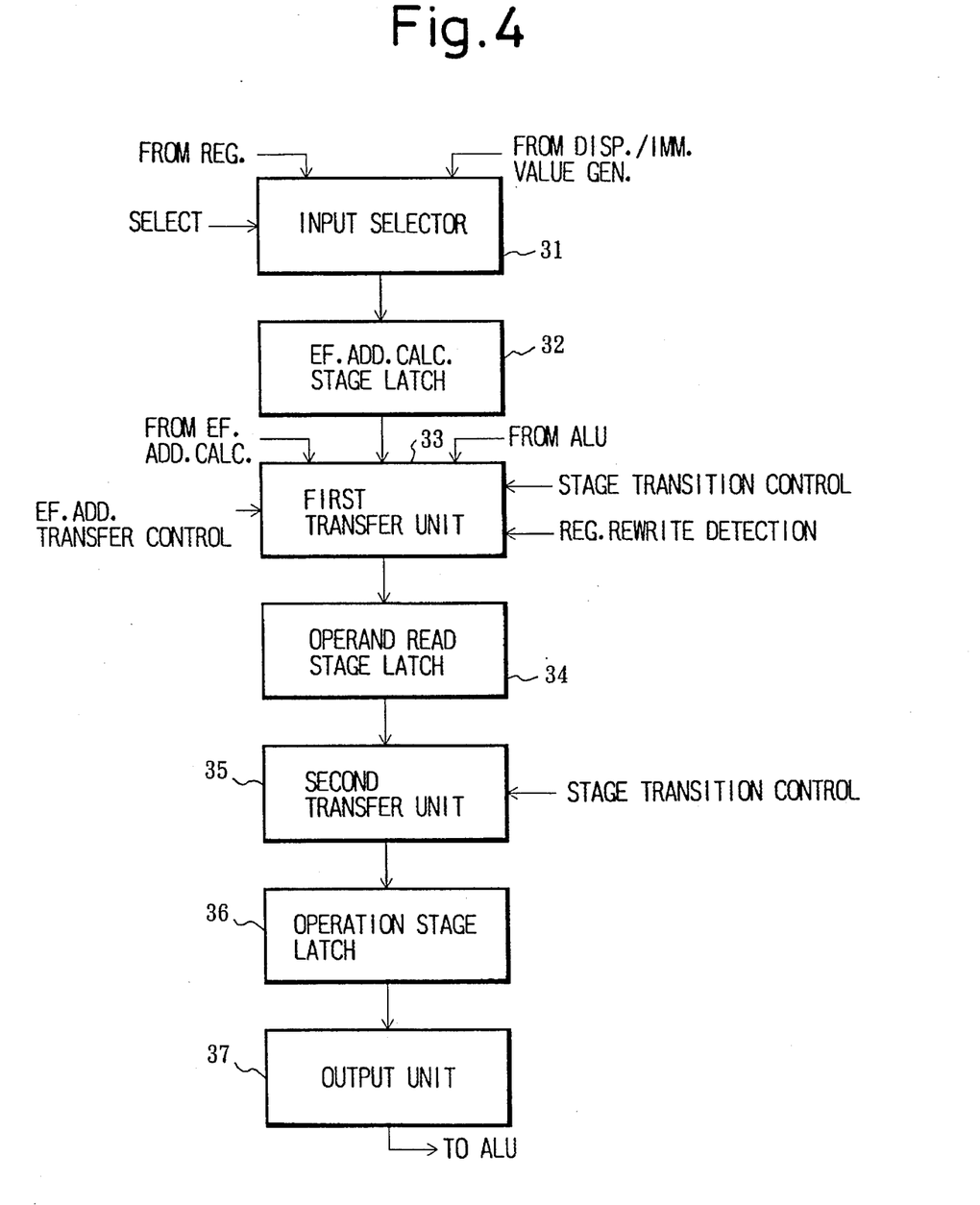
FIG. 4 is a block diagram illustrating a constitution of the pipeline latch part in FIG. 3.

FIG. 4 illustrates a constitution of the pipeline latch part 14.

In the illustration, reference 31 denotes an input selector for selectively inputting data from the register part (11) or the displacement/immediate value generation part (21). In the present embodiment, where the designation of the effective address indicates a register-direct designation, the input selector 31 selects data from the register part 11, and where the designation of the effective address indicates an immediate value, the input selector 31 selects the immediate value from the displacement/immediate value generation part 21.

This selection control is carried out based on the control from the instruction decoder 26. Reference 32 denotes an effective address calculation stage latch for holding a register value or an immediate value designated by an effective address designation corresponding to an instruction in execution at the effective address calculation stage.

Also, reference 33 denotes a first transfer unit. When the pipeline processing by the instruction execution proceeds from the effective address calculation stage to the operand read stage, the first transfer unit 33 has the function of controlling transfer processings from the effective address calculation stage latch 32 to the subsequent pipeline stage latch (operand read stage latch 34). Where the register writing by other instruction being concurrently processed by the pipeline processing is a writing into a register corresponding to the register value held by the effective address calculation stage latch 32, the write data in place of the data of the effective address calculation stage latch 32 is transferred to the operand read stage latch 34. Also, where the present processor executes an instruction to transfer the effective address per se to the register part 11 or an external memory, or where the processor executes an instruction to access to a plurality of memories based on the effective address, the effective address is transferred to the operand read stage latch 34. Various controls with respect to the first transfer unit 33 are carried out based on the control from the instruction decoder 26. The operand read stage latch 34 is a block for holding a register value or an immediate value designated by an effective address designation corresponding to an instruction in execution at the operand read stage.

Also, reference 35 denotes a second transfer unit. When the pipeline processing by the instruction execution proceeds from the operand read stage to the operation stage, the second transfer unit 35 has the function of controlling transfer processings from the operand read stage latch 34 to the subsequent pipeline stage latch (operation stage latch 36). Various controls with respect to the second transfer unit 35 are carried out based on the control from the instruction decoder 26. The operation stage latch 36 is a block for holding a register value or an immediate value designated by an effective address designation corresponding to an instruction in execution at the operation stage. Also, reference 37 denotes an output unit for supplying the operation part 13 with data output from the operation stage latch 36.

Note, the bypass part 23 (see FIG. 3) is a hardware required in a pipeline constitution in which the writing into the register part 11 and the reading from the register part 11 are simultaneously carried out, and it is not required in a pipeline constitution in which the reading from the register part 11 is carried out after the writing into the register part 11. In this case, the second transfer unit 35 of the pipeline latch part 14 must have the function of transferring the write data into the register part 11 in place of the register value, as in the first transfer unit 33.

Figure 5:
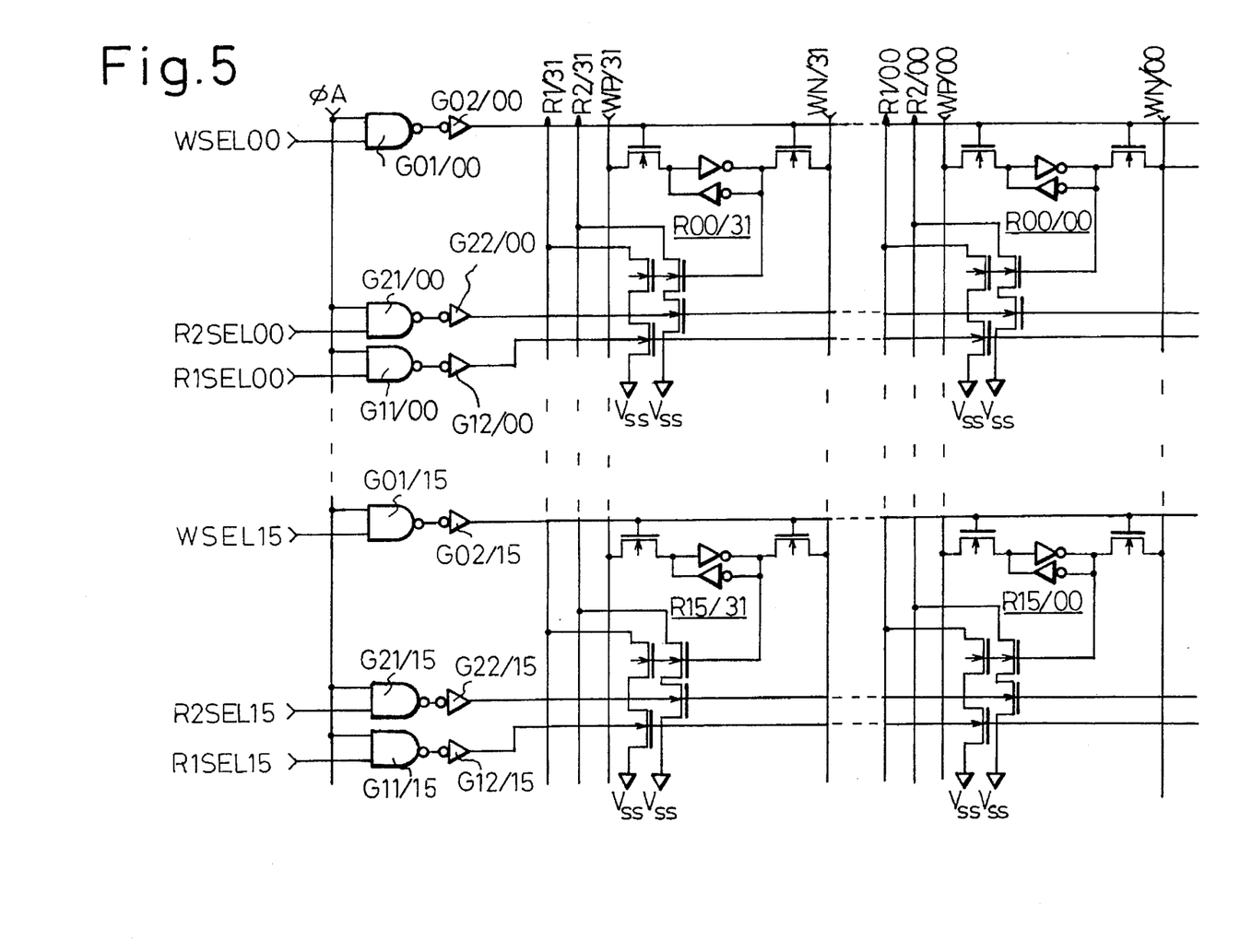
FIG. 5 is a circuit diagram illustrating a constitution of the data part of the register part in FIG. 3.

FIG. 5 illustrates a circuit constitution of the data part of the register part 11.

The illustrated data part includes a circuit part having sixteen register circuits, each register circuit having thirty-two registers R##/00 to R##/31 (##=00 to 16), and NAND gates G01/00 to G01/15, G11/00 to G11/15, G21/00 to G21/15, and input inversion type inverters G02/00 to G02/15, G12/00 to G12/15, G22/00 to G22/15 for selecting each register based on control signals (stated later) fed from the instruction decoder 26.

References R1SEL00 to R1SEL15 denote control signals for designating register numbers indicating the register-reading for carrying out the effective address calculation at the effective address calculation stage. For example, where the control signal R1SEL00 is asserted, one register circuit having thirty-two registers R00/00 to R00/31 is selected through the NAND gate G11/00 and the inverter G12/00. Thus, data of the selected register circuit are read out, and then output to the read data lines R1/00 to R1/31, respectively.

Also, references R2SEL00 to R2SEL15 denote control signals for designating register numbers indicating the register-reading for carrying out the operation processing at the operation stage. For example, where the control signal R2SEL00 is asserted, one register circuit having thirty-two registers R00/00 to R00/31 is selected through the NAND gate G21/00 and the inverter G22/00. Thus, data of the selected register circuit are read out, and then output to the read data lines R2/00 to R2/31, respectively.

Also, references WSEL00 to WSEL15 denote control signals for designating register numbers for writing results of the operation processing into registers at the operand write stage. For example, where the control signal WSEL00 is asserted, one register circuit having thirty-two registers R00/00 to R00/31 is selected through the NAND gate G01/00 and the inverter G02/00. Thus, data are written from the write data lines WP/00 to WP/31 and WN/00 to WN/31 into the selected register circuit.

Figure 6:
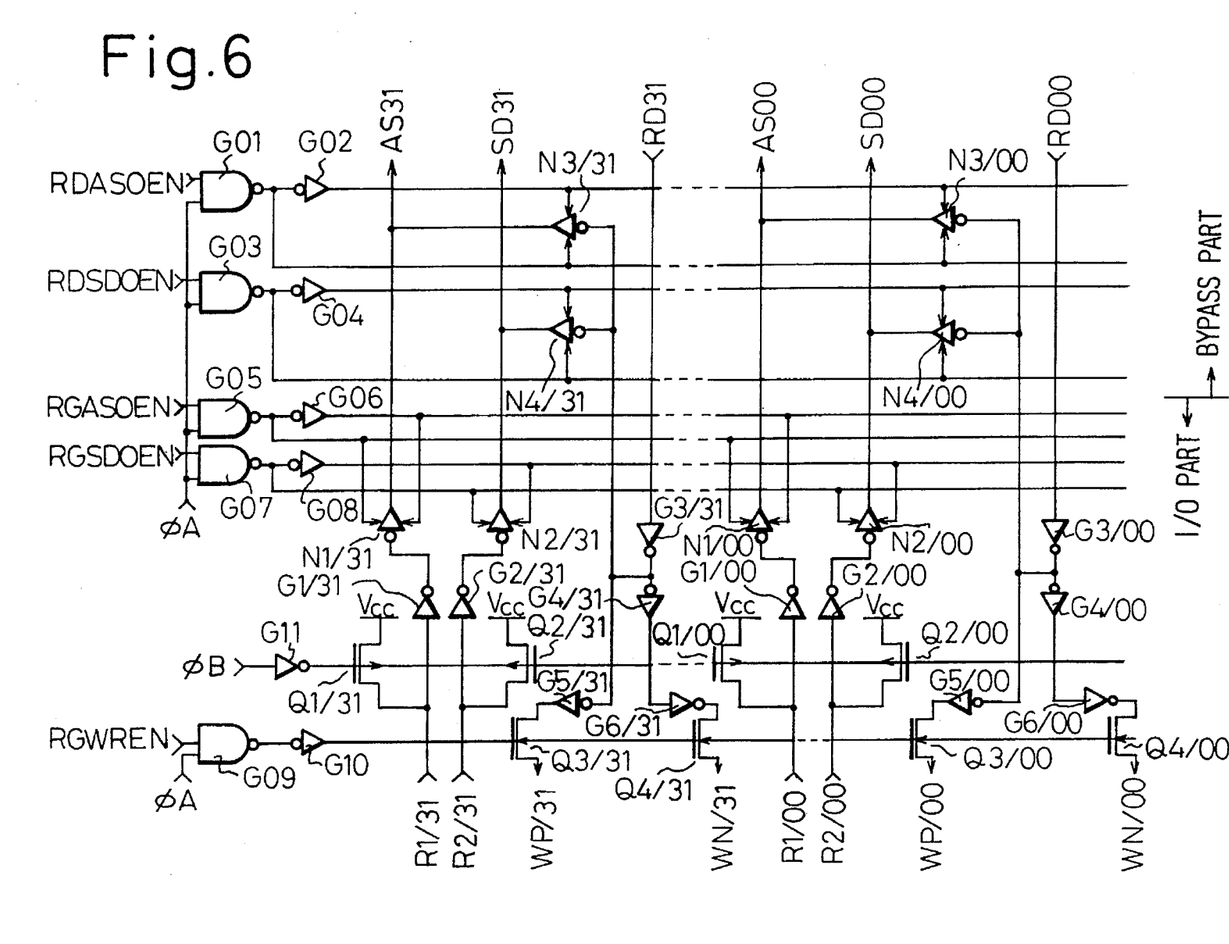
FIG. 6 is a circuit diagram illustrating a constitution of the I/O part of the register part and the bypass part in FIG. 3.

FIG. 6 illustrates a circuit constitution of the I/O part of the register part 11 and the bypass part 23.

As a whole, based on various control signals (stated later) fed from the instruction decoder 26, the I/O part of the register part 11 has the function of outputting data, read from the data part of the register part 11 via the read data lines R1/00 to R1/31 and R2/00 to R2/31, to the buses AS00 to AS31 and SD00 to SD31, and of inputting write data from the buses RD00 to RD31 to the write data lines WP/00 to WP/31 and WN/00 to WN/31. On the other hand, as a whole, the bypass part 23 responds to various control signals (stated later) fed from the instruction decoder 26, and where the designation of a register which is an object of the writing into the register part 11 is the same as that of a register which is an object of the reading from the register part 11, the bypass part 23 outputs data, written into the register from the buses RD00 to RD31, as read data, directly to the buses AS00 to AS31 and SD00 to SD31.

Concretely, for effecting output control of register read data, the I/O part includes NAND gates G05, G07, input inversion type inverters G06, G08, two-input control type inverters N1/00 to N1/31, N2/00 to N2/31, and inverters G1/00 to G1/31, G2/00 to G2/31. Also, for effecting input control of register write data, the I/O part includes a NAND gate G09, input inversion type inverters G10, G4/00 to G4/31, G5/00 to G5/31, inverters G3/00 to G3/31, G6/00 to G6/31, and N-channel transistors Q3/00 to Q3/31, Q4/00 to Q4/31. Also, for controlling validity/invalidity of the register read data, the I/O part includes an inverter G11 and P-channel transistors Q1/00 to Q1/31, Q2/00 to Q2/31.

On the other hand, for bypassing the write data as read data, the bypass part includes NAND gates G01, G03, input inversion type inverters G02, G04, and two-input control type inverters N3/00 to N3/31, N4/00 to N4/31.

Figure 7:
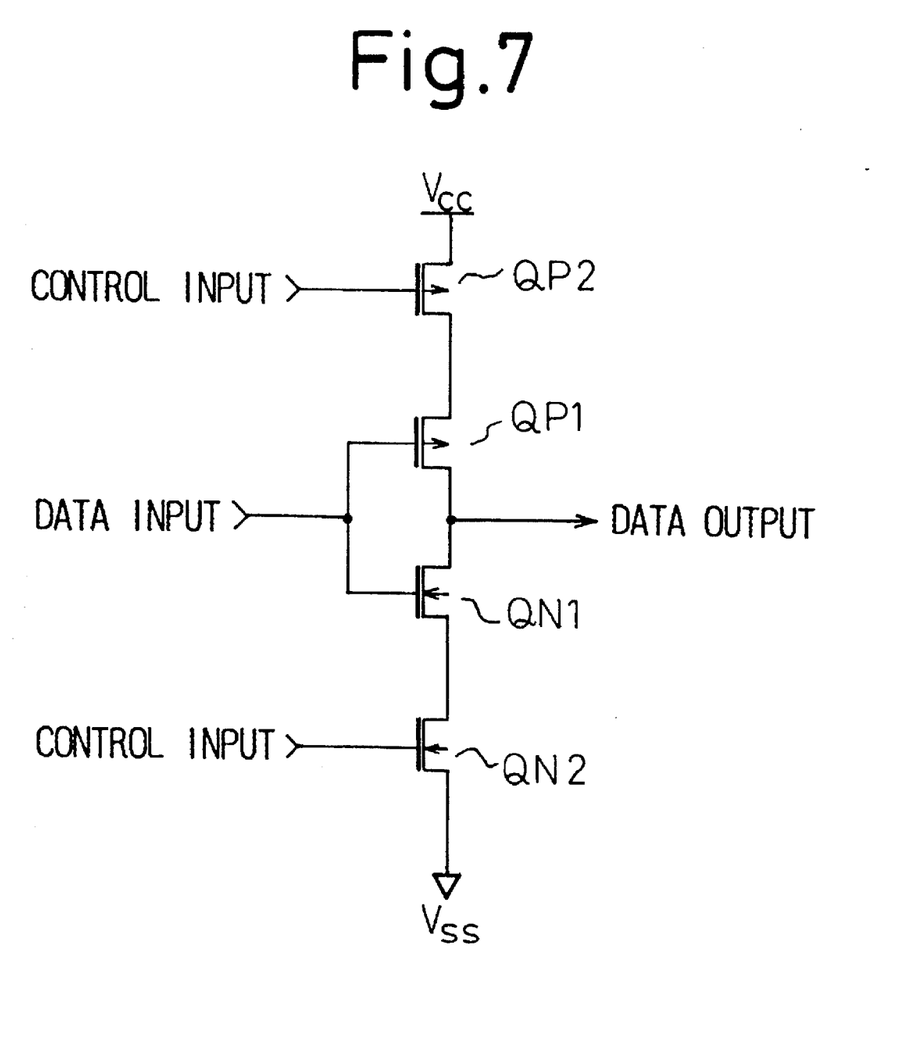
FIG. 7 is a circuit diagram illustrating a constitution of the two-input control type inverter in FIG. 6.

Note, FIG. 7 illustrates a circuit constitution of the two-input control type inverter N#/00 to N#/31 (#=1 to 4). The illustrated circuit is constituted by P-channel transistors QP2, QP1 and N-channel transistors QN1, QN2 connected in series between power supply lines Vcc and Vss. The P-channel transistor QP2 and the N-channel transistor QN2 are turned ON or OFF in response to respective control inputs, and thus a data input is output as a data output via a CMOS inverter (QP1, QN1).

In FIG. 6, reference RGASOEN denotes a control signal for controlling register read data, which are used for carrying out the effective address calculation at the effective address calculation stage, to be output to the buses AS00 to AS31. Where the control signal RGASOEN is asserted, the two-input control type inverters N1/00 to N1/31 are brought to an enable state through a NAND gate G05 and an inverter G06, and thus the data on the read data lines R1/00 to R1/31 are output to the buses AS00 to AS31, respectively.

Also, reference RGSDOEN denotes a control signal for controlling register read data, which are used for carrying out the operation processing at the operation stage, to be output to the buses SD00 to SD31. Where the control signal RGSDOEN is asserted, the two-input control type inverters N2/00 to N2/31 are brought to an enable state through a NAND gate G07 and an inverter G08, and thus the data on the read data lines R2/00 to R2/31 are output to the buses SD00 to SD31, respectively.

Also, reference RGWREN denotes a control signal for controlling write data on the buses RD00 to RD31, which are used for writing results of the operation processing into registers at the operand write stage, to be output to the write data lines WP/00 to WP/31 and WN/00 to WN/31. Where the control signal RGWREN is asserted, the N-channel transistors Q3/00 to Q3/31 and Q4/00 to Q4/31 are turned ON through a NAND gate G09 and an inverter G10, and thus the data on the buses RD00 to RD31 are output to the write data lines WP/00 to WP/31 and WN/00 to WN/31.

Also, reference RDASOEN denotes a control signal for controlling data, which are used for carrying out the effective address calculation at the effective address calculation stage, to bypass the buses RD00 to RD31 and then to be fed to the buses AS00 to AS31. Where the control signal RDASOEN is asserted, the two-input control type inverters N3/00 to N3/31 are brought to an enable state through a NAND gate G01 and an inverter G02, and thus the data on the buses RD00 to RD31 are output to the buses AS00 to AS31, respectively.

Also, reference RDSDOEN denotes a control signal for controlling data, which are used for carrying out the operation processing at the operation stage, to bypass the buses RD00 to RD31 and then to be fed to the buses SD00 to SD31. Where the control signal RDSDOEN is asserted, the two-input control type inverters N4/00 to N4/31 are brought to an enable state through a NAND gate G03 and an inverter G04, and thus the data on the buses RD00 to RD31 are output to the buses SD00 to SD31, respectively.

Figure 8:
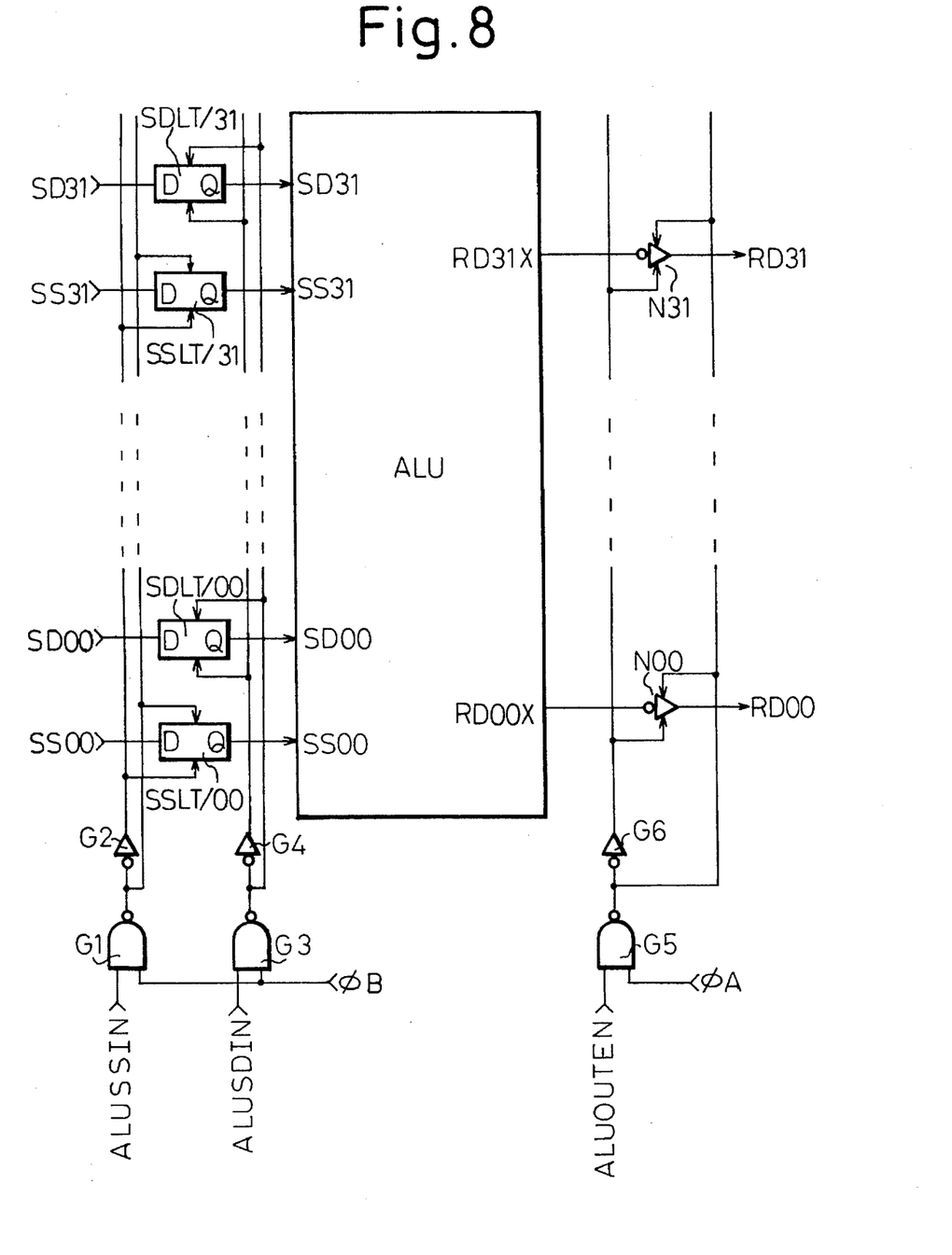
FIG. 8 is a circuit diagram illustrating a constitution of the operation part (ALU) in FIG. 3.

FIG. 8 illustrates a circuit constitution of the operation part (ALU) 13.

In the illustration, references SSLT/00 to SSLT/31 denote latches which receive data on the buses SS00 to SS31, respectively, at the operation stage and feed the data as operation data to the ALU part. Where a control signal ALUSSIN fed from the instruction decoder 26 is asserted, the latches SSLT/00 to SSLT/31 are brought to an enable state through a NAND gate G1 and an inverter G2, and thus the data on the buses SS00 to SS31 are input to the ALU part, respectively.

Also, references SDLT/00 to SDLT/31 denote latches which receive data on the buses SD00 to SD31, respectively, at the operation stage and feed the data as operation data to the ALU part. In the like manner, where a control signal ALUSDIN fed from the instruction decoder 26 is asserted, the latches SDLT/00 to SDLT/31 are brought to an enable state through a NAND gate G3 and an inverter G4, and thus the data on the buses SD00 to SD31 are input to the ALU part, respectively.

Also, references N00 to N31 denote two-input control type inverters which receive operation results, respectively, from the ALU part at the operand write stage and output the operation results to the buses RD00 to RD31. In the like manner, where a control signal ALUOUTEN fed from the instruction decoder 26 is asserted, the inverters N00 to N31 are brought to an enable state through a NAND gate G5 and an inverter G6, and thus the data are input to the buses RD00 to RD31. Note, the circuit constitution of each two-input control type inverter N00 to N31 is the same as that shown in FIG. 7.

Figure 9:
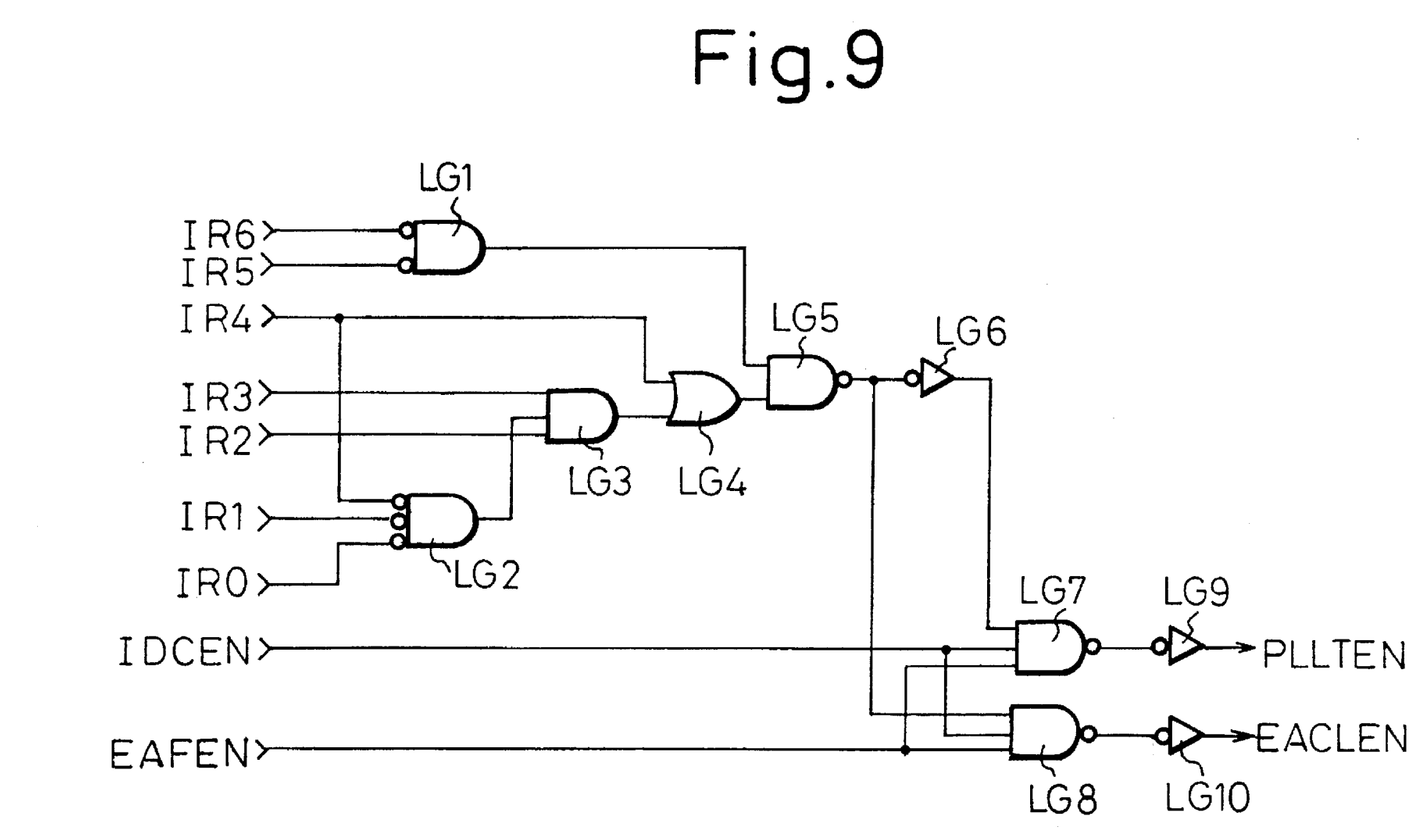
FIG. 9 is a circuit diagram illustrating a constitution of the effective address designation part of the instruction decoder in FIG. 3.

FIG. 9 illustrates a circuit constitution of the effective address designation part of the instruction decoder 26.

As a whole, the illustrated circuit responds to instruction codes (operation codes) of seven bits IR6 to IR0, a control signal IDCEN generated within the decoder and indicating validity of instruction decoding, and a control signal EAFEN generated within the decoder and indicating validity of effective address designation, and then outputs control signals (a control signal PLLTEN indicating validity of pipeline latch, and a control signal EACLEN indicating validity of effective address calculation) indicating whether data of the register part should be fed to the pipeline latch part 14 or to the effective address calculation part 12.

Concretely, the illustrated effective address designation part includes: an input inversion type AND gate LG1 responsive to the instruction codes IR6 and IR5; an input inversion type AND gate LG2 responsive to the instruction codes IR4, IR1 and IR0; an AND gate LG3 responsive to an output of the AND gate LG2 and the instruction codes IR3 and IR2; an OR gate LG4 responsive to an output of the AND gate LG3 and the instruction code IR4; a NAND gate LG5 responsive to an output of the OR gate LG4 and an output of the AND gate LG1; an input inversion type inverter LG6 responsive to an output of the NAND gate LG5; a NAND gate LG7 responsive to an output of the inverter LG6 and the control signals IDCEN and EAFEN; a NAND gate LG8 responsive to the output of the NAND gate LG5 and the control signals IDCEN and EAFEN; an input inversion type inverter LG9 responsive to an output of the NAND gate LG7 and generating the control signal PLLTEN; and an input inversion type inverter LG10 responsive to an output of the NAND gate LG8 and generating the control signal EACLEN.

Figure 10:
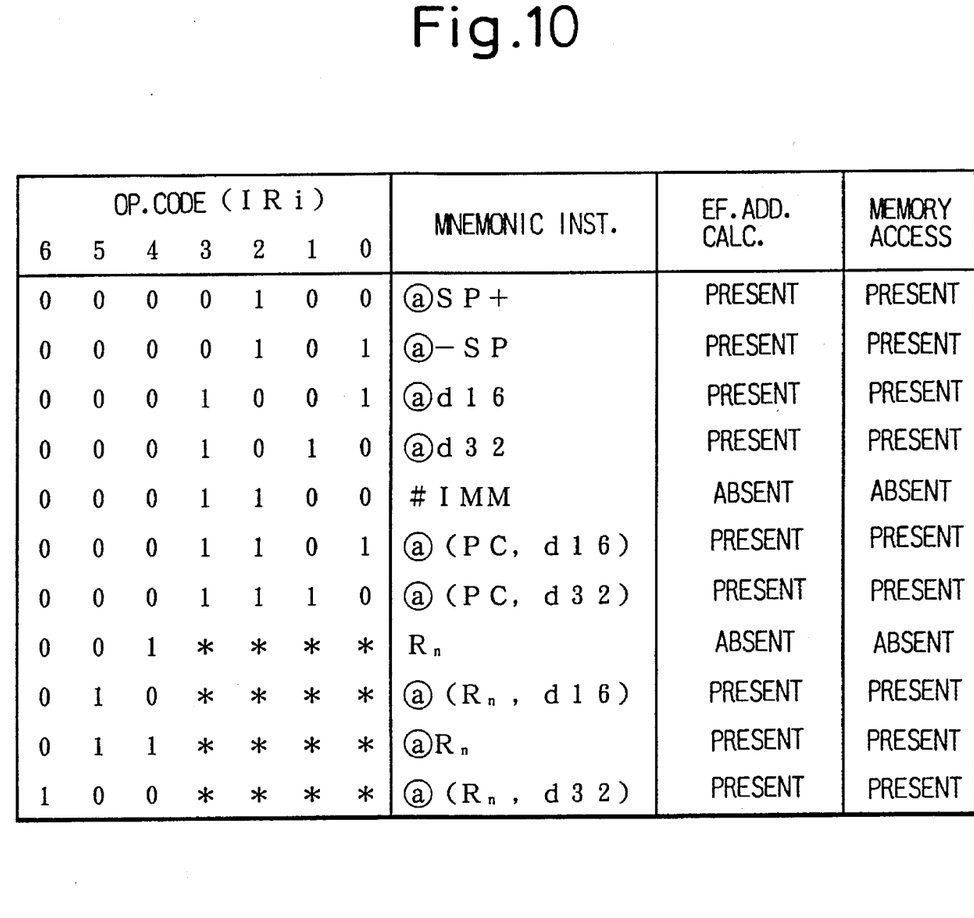
FIG. 10 is an explanatory diagram of the operation of the circuit of FIG. 9.

For reference, FIG. 10 shows an example of the operation of the circuit of FIG. 9.

Figure 11:
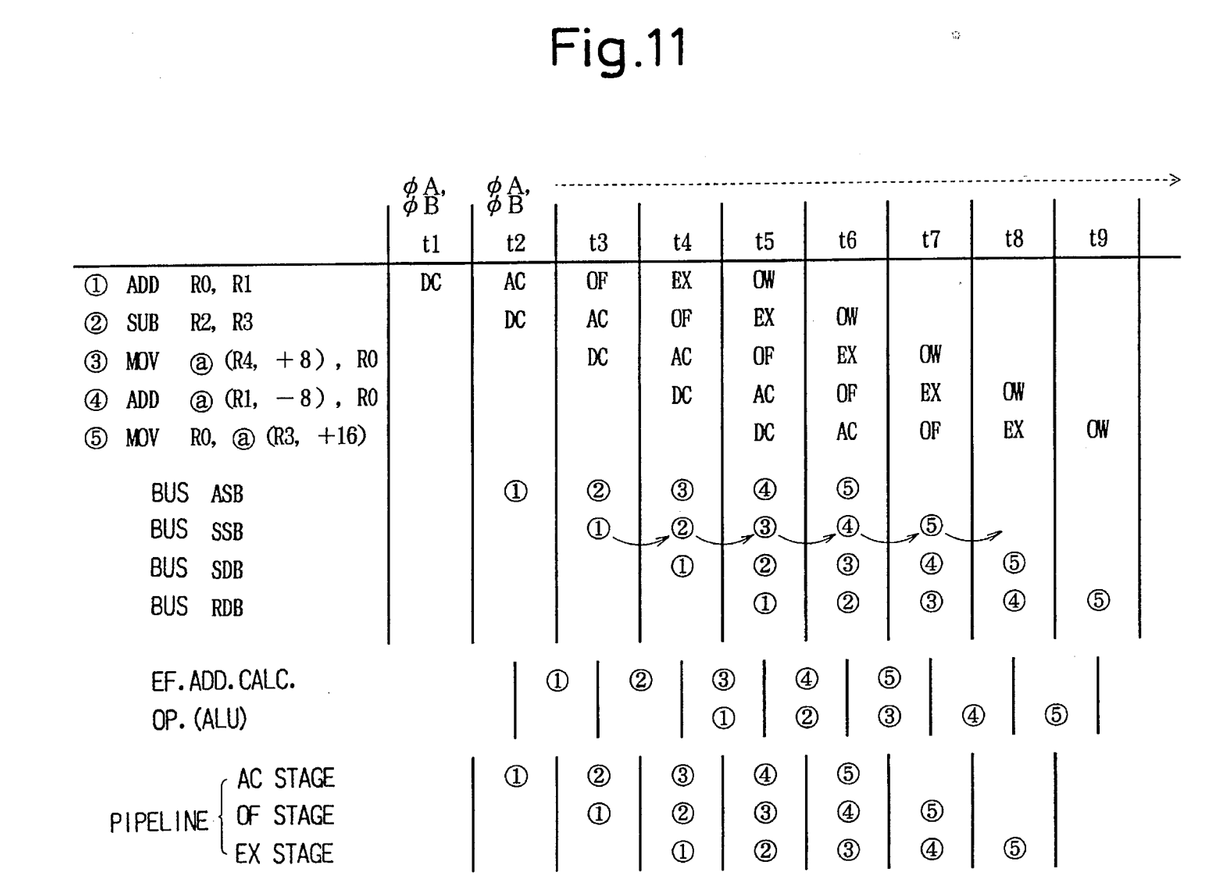
FIG. 11 is an operational timing chart showing an example of the pipeline processing executed by the processor of FIG. 3.

FIG. 11 shows an example of the pipeline processing executed by the processor of the present embodiment, in a time-series manner.

In the illustration, references ① to ⑤ denote instructions to be processed; reference DC denotes a status in which the execution of instruction is carried out at the instruction decoding stage; reference AC denotes a status in which the execution of instruction is carried out at the effective address calculation stage; reference OF denotes a status in which the execution of instruction is carried out at the operand read stage; reference EX denotes a status in which the execution of instruction is carried out at the operation stage; and reference OW denotes a status in which the execution of instruction is carried out at the operand write stage.

Also, references t1, t2, . . . . , denote time slots (cycles) defined by the clocks ϕ A and ϕ B fed from the instruction decoder 26. The pipeline processing in the present embodiment is executed in synchronization with each cycle. For example, referring to the first cycle t1, the instruction ① has been processed at the instruction decoding stage (DC).

Furthermore, as for the respective buses ASB, SSB, SDB and RDB, which of the instructions employs each bus is shown. For example, referring to the fourth cycle t4, the bus SDB is occupied by the instruction ①.

As explained above, according to the constitution of the present embodiment, the pipeline latch part 14 carries out register-reading processing for the operation stage at the effective address calculation stage, and every time the execution of instruction proceeds to a subsequent pipeline stage, the pipeline latch part 14 transfers the register-read data from the effective address calculation stage latch 32 via the operand read stage latch 34 to the operation stage latch 36. When the execution of instruction proceeds to the operation stage, the pipeline latch part 14 takes out the register value as an operand data from the operation stage latch 36.

Namely, the pipeline latch part 14 holds the register value read from the register part 11 at the effective address calculation stage until a timing at which the register value is required at the operation stage, and feeds the held register value as the operand data to the operation part 13.

Therefore, without lowering the performance of the pipeline processing, it is possible to decrease the number of read ports of the register part 11, compared with the prior art (see FIG. 1), and thus to reduce the scale of circuit of the register part 11. Also, by reducing the scale of circuit of the register part 11, it is possible to remove a disadvantage due to the wiring length as seen in the prior art, i.e., a problem in that the signal propagation delay becomes large resulting in a lowering in the operation speed.

Although the present invention has been disclosed and described by way of one embodiment, it is apparent to those skilled in the art that other embodiments and modifications of the present invention are possible without departing from the spirit or essential features thereof.

I claim:

1. A processor which executes instructions using pipeline processing having an effective address calculation stage that uses a displacement from an instruction code and an operation stage that performs an operation, at least one stage existing between the effective address calculation stage and the operation stage, the processor comprising:

a register which temporarily stores data;

a pipeline latch part which includes a respective latch provided for, and respectfully corresponding to, each stage between the effective address calculation stage and the operation stage and includes a respective latch corresponding to the operation stage, the pipeline latch part, during the effective address calculation stage, receiving data stored in the register and transferring the received data through the each respective latch in accordance with the execution of instructions to provide the data to the respective latch corresponding to the operation stage when the operation stage performs the operation;

an effective address calculation part which, during the effective address calculation stage, receives data stored in the register and adds the data to the displacement of the instruction code, to thereby calculate an effective address; and an operation part which, during the operation stage, receives data stored in the register, receives data from the latch corresponding to the operation stage in the pipeline latch part, executes the operation on the received data, produces a corresponding result and supplies the result to the register.

2. The processor as set forth in claim 1, wherein the pipeline latch part comprises:

means for receiving data from the register during the effective address calculation stage;

transfer means for transferring the data received from the register through each respective latch in accordance with the execution of instructions; and means for providing data from the respective latch corresponding to the operation stage when the execution of instruction proceeds to the operation stage and a designation of the effective address indicates a register-direct designation.

3. The processor as set forth in claim 2, wherein the pipeline processing has an operand read stage between the effective address calculation stage and the operation stage, the pipeline latch part includes a respective latch corresponding to the effective address calculation stage and a respective latch corresponding to the operand read stage, and the transfer means transfers data from the latch corresponding to the effective address calculation stage to the latch corresponding to the operand read stage in accordance with the execution of instructions.

4. The processor as set forth in claim 3, wherein, when an instruction to be executed indicates an instruction to transfer a result of the effective address calculation stage to the register or an external memory, the transfer means transfers the result of the effective address calculation stage to the latch corresponding to the operand read stage, instead of transferring data from the latch corresponding to the effective address calculation stage to the latch corresponding to the operand read stage.

5. The processor as set forth in claim 2, wherein the pipeline processing has an operand read stage between the effective address calculation stage and the operation stage, the pipeline latch part includes a respective latch corresponding to the operand read stage, and the transfer means transfers data from the latch corresponding to the operand read stage to the latch corresponding to the operation stage in accordance with the execution of instructions.

6. The processor as set forth in claim 2, wherein the pipeline latch part includes a respective latch corresponding to the effective address calculation stage and, when the latch corresponding to the effective address calculation stage takes thereinto a register value corresponding to a register into which data has been written in accordance with the execution of instructions, the respective latch inputs the register write data in place of the register value.

7. The processor as set forth in claim 2, wherein the pipeline latch part includes a respective latch corresponding to the effective address calculation stage and, when a designation of the effective address indicates an immediate value designation, the latch corresponding to the effective address calculation stage inputs an immediate value in place of the data in the register.

8. The processor as set forth in claim 1, wherein the processor is a single chip.

* * * * *